May 16, 1944. C. J. WAGNER 2,348,869
VEHICLE LANDING GEAR
Filed Jan. 11, 1943
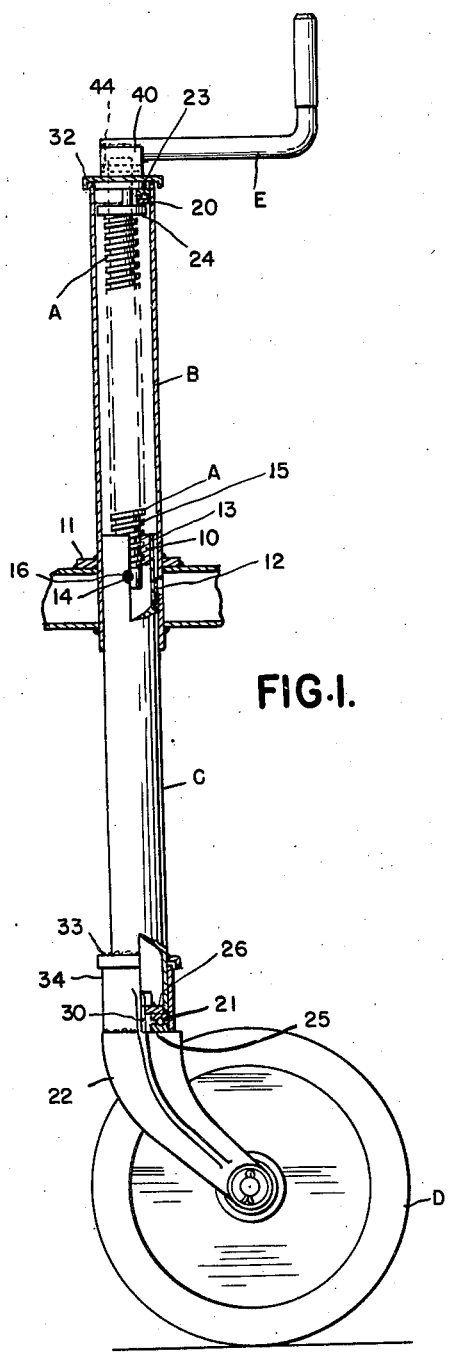
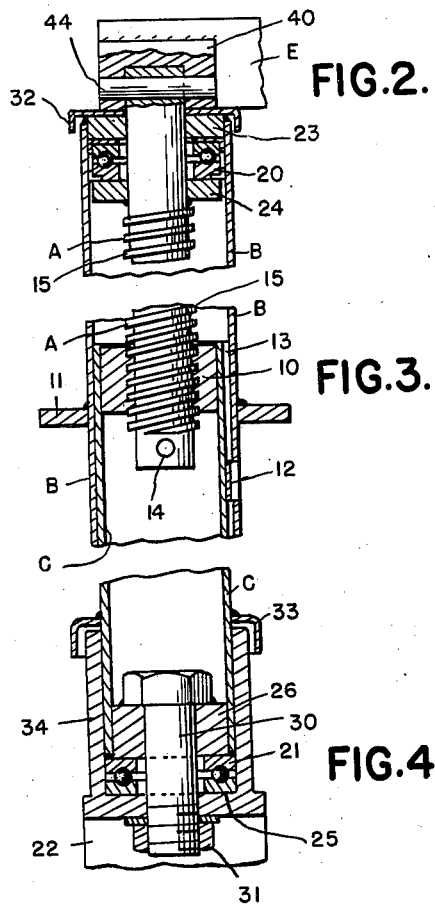
INVENTOR.
CARL J. WAGNER
BY
Whittemore Hulbert Belknap
ATTORNEYS Patented May 16, 1944

2,348,869

UNITED STATES PATENT OFFICE 2,348,869

VEHICLE LANDING GEAR

Carl J. Wagner, Detroit, Mich.

Application January 11, 1943, Serial No. 472,040

4 Claims. (Cl. 254—86)

This invention relates generally to vehicle landing gear and refers more particularly to an improved landing gear for the forward end of trailers.

One of the essential objects of the invention is to provide a gear of the type mentioned that may be easily operated by hand to raise and lower the forward end of a trailer and to support the same at a desirable elevation from the ground.

Another object is to provide a gear that is operable after the trailer has been coupled to a pulling vehicle to raise from the ground for clearance purposes the ground engaging wheel of the gear upon which the forward end of the trailer is supported when uncoupled from the pulling vehicle.

Another object is to provide a landing gear wherein the working parts thereof are enclosed and protected from the weather elements, dirt, dust, etc., which otherwise might impair its operation.

Another object is to provide a landing gear wherein the telescoping tubes employed as a part of the enclosure mentioned will compensate for any misalignment of the operating screw and will give the proper lateral support to one another even in the extended position of the assembly to insure efficient operation of the gear at all times.

Another object is to simplify, render more efficient, and improve generally landing gear of the type mentioned.

Other objects, advantages and novel details of construction of this invention will be made more apparent as this description proceeds, especially when considered in connection with the accompanying drawing, wherein:

Figure 1 is an elevational view of a landing gear embodying my invention with parts broken away and in section;

Figure 2 is a fragmentary vertical sectional view through the upper portion of the structure illustrated in Figure 1;

Figure 3 is a fragmentary vertical sectional view through the mid portion of the structure illustrated in Figure 1;

Figure 4 is a fragmentary vertical sectional view through the lower portion of the structure illustrated in Figure 1;

Figure 5 is an elevational view of an alternate form of handle that may be used to operate the screw.

Referring now to the drawing, A is the operating screw, and B and C, respectively, are the telescoping tubes forming a part of the enclosure for the screw, and D is the ground engaging wheel of a landing gear embodying my invention.

As shown, the operating screw A extends axially of the tube B and threadedly engages a nut 10 welded or otherwise rigidly secured to the tube C at its upper end. Any suitable means such as the L-shaped handle E or the U-shaped handle E' illustrated in Figure 5 may be employed to turn the screw A in the nut 10 to raise and lower the wheel D relative to the ground.

In the present instance, the tube B is provided adjacent its lower end with a lateral flange or bracket 11 that is adapted to be rigidly attached to the frame (not shown) of a trailer, preferably at the front end thereof, so that the gear may support the same at the desired elevation relative to the ground. For example, the forward end of the trailer may be supported at one elevation when uncoupled from a pulling vehicle and then may be raised or lowered to effect a proper coupling with the pulling vehicle. Also, after the coupling with the pulling vehicle is made, the wheel D may be raised relative to the ground for clearance purposes and may later be lowered into supporting engagement with the ground when it is desired to uncouple the pulling vehicle from the trailer.

To insure proper action of the parts during operation of the screw A there is a spline or key 12 in the tube B that engages a longitudinally extending slot or groove 13 in the tube C to prevent relative turning movement, and there is a pin 14 extending diametrically of the screw A below the threads 15 thereof to prevent displacement of the screw from the nut 10. Actually the spline 12 is a plug in one side of the tube B and may be anchored therein in any suitable manner. The pin 14 is inserted through a hole 16 in one side of the tube C into the screw A and is short enough to clear the cylindrical wall of this tube C when fully inserted into the screw A, yet is sufficiently long to provide the proper obstruction on the screw for engagement with the underside of the nut 10 to effectively prevent accidental withdrawal of the screw A from the nut 10 after the parts are assembled.

At the upper end of the tube B and at the lower end of the tube C are thrust bearings 20 and 21, respectively, which permit relative turning movement under load strains and stresses of the screw A relative to the tube B and of the attaching fork 22 for the wheel D relative to the tube C. Preferably the thrust bearing 20 is between collars 23 and 24, respectively, rigid with the tube B and screw A, while the thrust bearing 21 is between a horizontal portion 25 of the fork 22 and an insert 26 rigid with the tube C. Any suitable means such as a bolt 30 and nut 31 may be employed to swivelly connect the fork 22 to the insert 26. A flanged shield 32 on top of and rigid with the collar 23 covers the upper end of the tube B, and a similarly flanged shield 33 rigid with the tube C above the upstanding sleeve portion 34 of the fork 22 are employed to cooperate with the telescoping tubes B and C to enclose and protect the working parts of the assembly.

The handles E and E', respectively, have inverted cup-shaped hubs 40 and 41, respectively, for receiving the upper end of the screw A, and are adapted to be alternately fixed thereto by any suitable means such as a transversely extending pin 44.

In use, either of the handles E and E', respectively, or any other suitable handle (not shown) may be operated to turn the screw A in the nut 10 and cause the tube C to move longitudinally of the tube B to raise or lower the wheel D relative to the ground. Inasmuch as the bracket 11 and tube B are rigid with the frame of the trailer it will be apparent that the tube C and wheel D carried thereby will move relative thereto when the screw A is turned as aforesaid. Moreover, the spline 12 and groove 13 will cooperatively prevent relative turning movement between the tubes B and C, and the pin 14 will prevent the accidental withdrawal of the screw A from the nut 10, hence a positive, efficient operation is obtained.

Any suitable means (not shown) may be employed to connect the bracket 11 to the frame of a trailer or to the frame of any other vehicle or device to which the landing gear as a whole may be applied.

What I claim as my invention is:

1. In a vehicle landing gear, a tube, a fork for a ground wheel having a tubular part sleeved upon and adapted to turn relative to an end portion of the tube and provided in spaced relation to said end portion with a transverse portion, an insert within and rigid with the end portion of the tube, a swivel connection between the transverse portion of the fork and said insert, and a thrust bearing encircling the swivel connection between the transverse portion of the fork and said insert.

2. In a vehicle landing gear, a tube, a fork for a ground wheel having a tubular part sleeved upon and adapted to turn relative to an end portion of the tube and provided in spaced relation to said end portion with a transverse portion, an insert within and rigid with the end portion of the tube, a swivel connection between the transverse portion of the fork and said insert, a thrust bearing encircling the swivel connection between the transverse portion of the fork and said insert, and means for protecting the working surfaces of the tube and tubular part of the fork and the thrust bearing from the weather elements including a shield on the tube and overhanging the tubular part of the fork.

3. In a vehicle landing gear, a rotatable operating screw, an extensible enclosure for said screw including a pair of relatively slidable non-rotating telescoping open ended tubes, a nut threadedly engaging said screw and anchored within one of said tubes, the other of said tubes being provided with means by which the landing gear may be attached to a frame of a vehicle, an attaching fork for a ground engaging wheel having a socket portion sleeved upon and closing an end of one of said tubes, an insert within and rigid with said tube, a swivel connection between the base of the socket portion and said insert, and a thrust bearing about said connection between the insert and base of said socket portion.

4. In a vehicle landing gear, a rotatable operating screw, an extensible enclosure for said screw including a pair of relatively slidable non-rotating telescoping open ended tubes, a nut threadedly engaging said screw and anchored within one of said tubes, an attaching fork for a ground engaging wheel having a socket portion sleeved upon and closing an end of one of said tubes, said fork being swiveled to said tube, and a flanged shield rigid with the tube just mentioned above and overhanging the sleeve portion of said fork so as to prevent dirt from entering between said sleeve portion and the tube upon which it is swiveled.

CARL J. WAGNER.